UNITED STATES PATENT OFFICE.

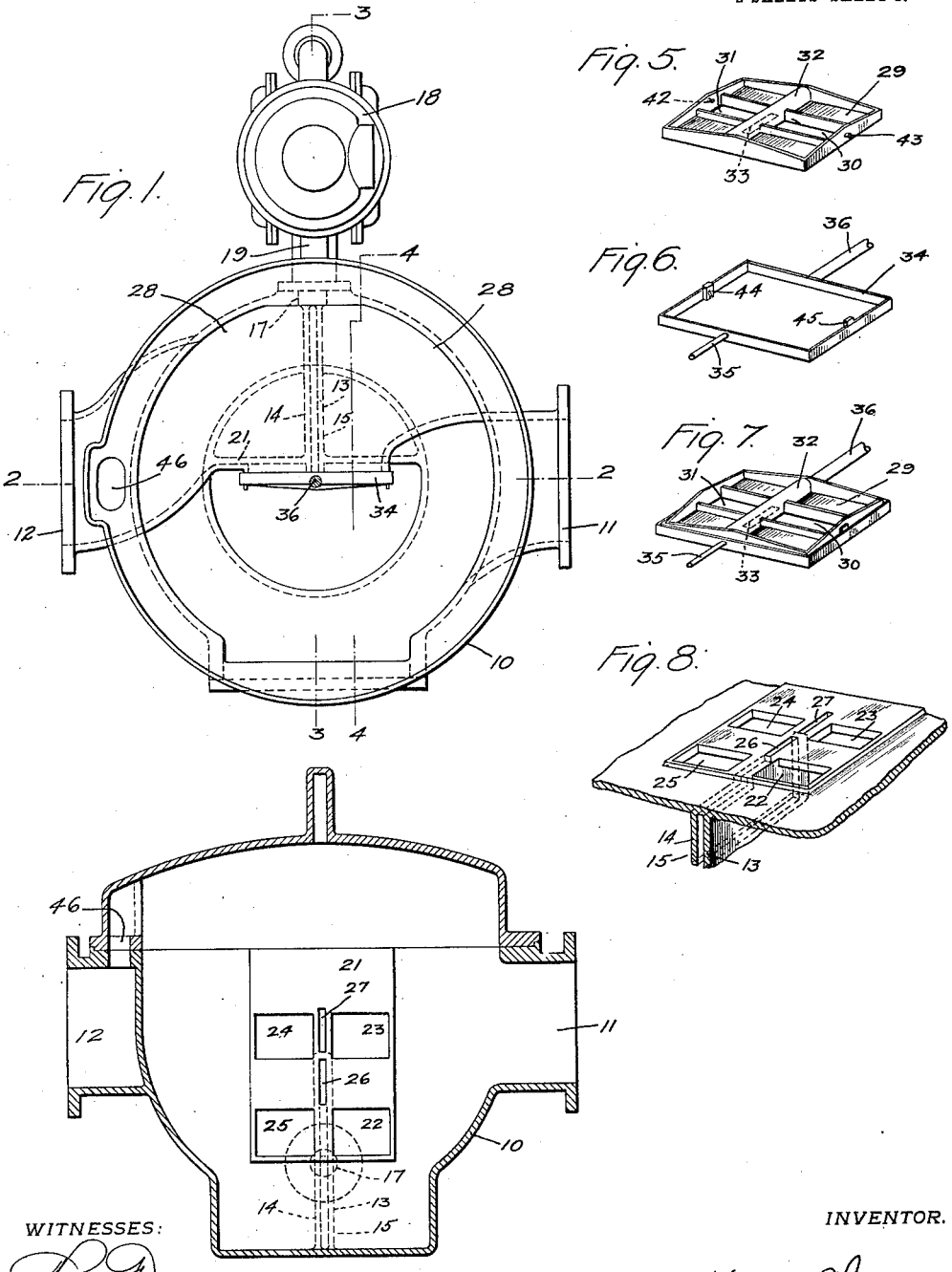

HORACE CHRISMAN, OF EDGEWOOD PARK, PENNSYLVANIA, ASSIGNOR TO PITTSBURG METER COMPANY, A CORPORATION OF PENNSYLVANIA.

GAS-METER.

1,089,393.     Specification of Letters Patent.     Patented Mar. 10, 1914.

Application filed April 9, 1910.  Serial No. 554,538.

*To all whom it may concern:*

Be it known that I, HORACE CHRISMAN, a citizen of the United States, and a resident of Edgewood Park, in the county of Allegheny and State of Pennsylvania, have made a new and useful Invention in Gas-Meters, of which the following is a specification.

This invention relates to the general class of meters, but more particularly to that class of measuring devices in which a portion only of the gas consumed is actually measured. These devices are known to the trade as proportional meters.

One object of my invention is to provide a proportional meter which will be so sensitive that its operation may be accomplished without any appreciable loss of pressure upon the line.

A further object of the invention is to so locate the proportional valve that it will not be subjected to deterioration due to contact with deleterious materials (such as dust, dirt and other foreign substances) contained in the case, a serious objection inherent in the present type of meters.

Another object is to provide means whereby the proportional valve may be readily accessible to facilitate its removal from the meter to permit regrinding, cleaning or calibrating, as well as to facilitate its reseating.

Other objects and advantages, as well as the novel details of construction, will be referred to hereinafter, it being understood that changes in form, proportion, and minor details of construction may be resorted to without departing from the spirit of the invention or sacrificing any of its advantages.

Figure 3:
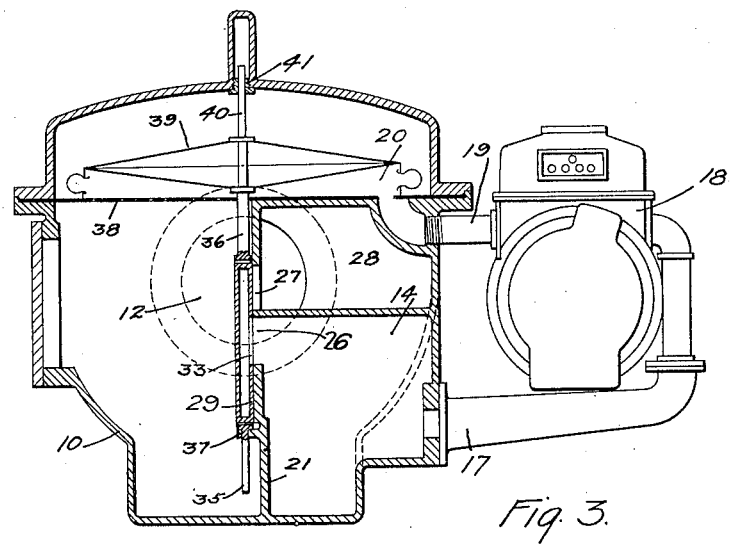
Figure 4:
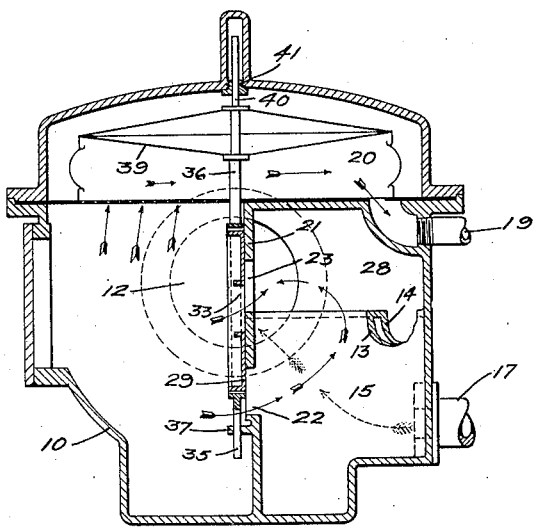

In the drawings: Figure 1 is a plan view of a meter constructed in accordance with my invention. Fig. 2 is a sectional view on the line 2—2 of Fig. 1. Fig. 3 is a partial sectional view on the line 3—3 of Fig. 1. Fig. 4 is a sectional view on the line 4—4 of Fig. 1. Fig. 5 is a detail perspective view of the valve for controlling the flow of gas through the meter. Fig. 6 is a detail perspective view of the valve-supporting frame. Fig. 7 is a detail perspective view of the valve and frame assembled; and Fig. 8 is a fragmentary perspective view of the channel partitioned for leading the gas into the proportional meter.

In the embodiment of my invention selected for illustration, I have shown a main casing, or chamber 10, provided with an inlet port 11, and an outlet port 12. Within the casing or chamber 10 is a conduit formed by the walls 13 and 14 of the double-walled partition 15. The conduit opens into the main casing through a port 26 and it is supplied with gas or air from an exhaust port 17 which is in communication with the tally meter 18. The tally meter 18 is provided with the usual registering mechanism to measure and indicate the volume of gas passing through it, and this meter 18 is supplied through a port 19 from the upper portion 20 of the casing 10.

21 is a partition which extends entirely across the casing 10 at right-angles to the partition 15, and the partition 21 is provided with port openings 22, 23, 24, and 25, adjacent to the partition 15. In the present instance, I have illustrated ports 22 and 23 as being on one side of the partition 15, while those indicated by the reference numerals 24 and 25 are located on the opposite side of the partition 15. The partition 21 is also provided with openings 26 and 27. The opening 26 registers with the conduit formed by the partition 15, while the opening 27 registers with a chamber 28 exterior to and above the conduit formed by the partition 15.

The ports just enumerated may be covered or uncovered by a valve illustrated in detail in Fig. 5. The valve is shown as being in the form of a plate 29 having central openings 30 and 31. The openings 30 and 31 are separated by a central channeled rib 32, the channel 33 of which is adapted to register with the ports 26 and 27, and through which gas may pass from the conduit 17 through the conduit formed by the partition 15, into the chamber 28. The frame for supporting the valve is best shown in Fig. 6, and it consists of a rectangular body portion 34, having two oppositely disposed rods or stems 35 and 36. The stem 35 is a guide stem, having movement in a perforated lug 37, while the stem 36 passes through the screen 38 in the upper portion of the casing 10 and is connected to a bellows diaphragm 39 in any well known manner. Projecting from the diaphragm 39 is a guide stem 40 which in practice may be a continuation of the stem 36, and this stem 40 is guided in a guide 41 at the top of the casing 10, so that only an up and down movement may be imparted to the frame 34, and, as a result, only an up and down movement may be imparted to the valve 29. The valve 29 is provided with lugs 42 and 43, which rest in lugs 44 and 45, provided with inclined grooves or seats to receive them. The open end of the seats in lugs 44 and 45 are adjacent to the partition 21, so any liability of the valve becoming displaced in practice will be eliminated.

Assuming now that all of the parts are properly assembled, gas may be admitted into the casing 10 through the opening 11. A certain proportion of the gas, say about one one-hundredth of its volume, will pass through the port 19, around through the tally meter, through the port 17, through the port 26, the channel 33, the port 27, into the chamber 28, and out through the port 12. The remainder of the gas will pass direct from the port 11, through the casing and out through port 12, in doing which sufficient pressure will be generated within the casing 10 to raise the diaphragm 39, to open the ports 22 to 25, inclusive. The pressure within the casing 10 will depend upon the amount of gas being consumed. For example, if a single jet was ignited on the consumption side of the meter, the gas passing into the casing 10 would only afford sufficient pressure to barely unseat the valve 29, to open the ports 22 to 25, inclusive. As the consumption became greater, however, more gas would be drawn into the casing, piling up more pressure, with the result that the diaphragm would be raised to a greater degree and the port areas 22 to 25, inclusive, would be increased. Therefore, it will be apparent, that the meter constructed in accordance with my invention will sensitively measure the gas passing through the casing 10 up to its maximum capacity, and that any flows of gas, from zero to the maximum capacity of the meter, will be sensitively registered by the tally meter 18. Outlet pressure is provided in the chamber above the diaphragm 39 through a port 46, Figs. 1 and 2.

Having now described my invention, what I claim is:

1. In a proportional meter, the combination of an inlet chamber, an outlet chamber, a tally meter, a meter delivery chamber, a diaphragm, a ported proportional valve connected to the diaphragm, one opening of said valve being for communication between the inlet chamber and the outlet chamber, and another opening thereof being for communication between the meter delivery chamber and the outlet chamber, and means connecting the valve and the diaphragm.

2. In a proportional meter, the combination of an inlet chamber and an outlet chamber, a tally meter, a conduit in communication with the exhaust from said tally meter, a diaphragm, a third chamber and a valve connected to the diaphragm and having openings, one of which is for communication between the inlet chamber and the outlet chamber and the other of which is for communication between the third chamber and the outlet chamber, said valve being operated by the diaphragm.

3. In a proportional meter, the combination with a main casing having an inlet opening and an outlet opening, a tally meter having an inlet port in communication with the inlet opening, an exhaust port and a delivery chamber for communication with the outlet opening in communication with the tally meter, a valve and ported valve seat between the inlet and outlet openings and adapted to effect communication between the exhaust port of the tally meter and the outlet port of the main casing, and a diaphragm for operating said valve.

4. In a proportional meter, the combination with a main casing having an inlet chamber and an outlet chamber, a tally meter having ports communicating with the inlet chamber and the outlet chamber, a valve and ported valve seat to effect communication between one of the ports of the tally meter and the outlet chamber, and a diaphragm for operating said valve.

5. In a proportional meter, the combination of a main casing having an inlet chamber and an outlet chamber, a tally meter in communication with the main casing, a slide valve having an opening for communication between the inlet chamber and the outlet chamber of the main casing and an opening for communication between the tally meter exhaust and the outlet chamber of the main casing, and a diaphragm for operating said valve.

6. In a proportional meter, the combination with a main casing having an inlet chamber and an outlet chamber, a tally meter having ported communication with the inlet chamber, a delivery chamber for the tally meter within the main casing, a ported valve seat, a valve for ported valve seat and having a port adapted to be brought into communication with the delivery chamber for the tally meter and the outlet chamber, and a port adapted to be brought into communication with the outlet chamber of the main casing, and means responsive to pressure for operating said valve.

7. In a meter, a frame having lugs provided with inclined notches, a valve having lugs adapted to engage said notches, said valve comprising a plate provided with ports.

8. In a meter, a frame provided with notched valve receiving portions, a plate valve provided with ports and having a rib provided with a groove, and lugs on said valve engaging the notched portions in the frame.

In testimony whereof, I have hereunto subscribed my name this 8th day of April, 1910.

HORACE CHRISMAN.

Witnesses:
C. W. McGHEE,
B. F. FUNK.

Copies of this patent may be obtained for five cents each, by addressing the "Commissioner of Patents, Washington, D. C."